United States Patent
Yanao (10) Patent No.: US 8,190,396 B2
(45) Date of Patent: May 29, 2012

(54) FAILURE DIAGNOSIS SYSTEM FOR COOLING FANS, A FAILURE DIAGNOSIS DEVICE FOR COOLING FANS, A FAILURE DIAGNOSIS METHOD FOR COOLING FANS, A COMPUTER READABLE MEDIUM THEREFOR AND A COOLING DEVICE

(75) Inventor: Takio Yanao, Tokyo (JP)

(73) Assignee: NEC Corporation, Tokyo (JP)

( * ) Notice: Subject to any disclaimer, the term of this patent is extended or adjusted under 35 U.S.C. 154(b) by 351 days.

(21) Appl. No.: 12/551,879

(22) Filed: Sep. 1, 2009

(65) Prior Publication Data

US 2010/0076728 A1 Mar. 25, 2010

(30) Foreign Application Priority Data

Sep. 19, 2008 (JP) .................. 2008-241459

(51) Int. Cl.
*G06F 11/30* (2006.01)
*G06F 11/00* (2006.01)
*G05D 23/00* (2006.01)

(52) U.S. Cl. ........ 702/183; 702/185; 700/300; 714/47.1
(58) Field of Classification Search .................. 702/183, 702/185; 700/300; 714/47.1
See application file for complete search history.

(56) References Cited

U.S. PATENT DOCUMENTS

| 6,932,696 B2 * | 8/2005 | Schwartz et al. ............. 454/184 |
| 2006/0143519 A1 * | 6/2006 | Maier et al. ..................... 714/25 |

FOREIGN PATENT DOCUMENTS

| JP | 2001068881 A | 3/2001 |
| JP | 2005057119 A | 3/2005 |

* cited by examiner

*Primary Examiner* — Andrew Schechter
*Assistant Examiner* — L. Anderson (57) ABSTRACT

The failure diagnosis system of cooling fans of the present invention includes a first cooling device, a second cooling device and a control device. The first cooling device has a first cooling fan, and the second cooling device has a second cooling fan. The control device executes a first failure diagnosis which checks failure of the second cooling fan based on the rotation rate of the second cooling fan at the time at which the rotation rate of the first cooling fan is reduced.

12 Claims, 9 Drawing Sheets

3 FAILURE DIAGNOSIS TABLE

| THRESHOLD-VALUE-OF-ROTATION-CHANGE-RATE(%) | CONTROLLED-ROTATION-CHANGE-RATE(%) | INITIAL-VALUE-OF-ROTATION-RATE(rpm) |
|---|---|---|
| 10 | 50 | 5000 |

FIG.4

4 PERIODIC DIAGNOSIS TABLE

| DETECTION TIMING(S) | THRESHOLD-VALUE-OF-ROTATION-CHANGE-RATE (%) | ACCUMULATED COUNT | INITIAL-VALUE-OF-ROTATION-RATE(rpm) |
|---|---|---|---|
| 60 | 20 | 5 | 5000 |

8 FAILURE DIAGNOSIS TABLE

| THRESHOLD-VALUE-OF-ROTATION-CHANGE-RATE(%) | CONTROLLED-ROTATION-CHANGE-RATE(%) | INITIAL-VALUE-OF-ROTATION-RATE(rpm) | CONSECUTIVE COUNT | A DIAGNOSIS TIMING(S) |
|---|---|---|---|---|
| 10 | 50 | 5000 | 2 | 10 |

FAILURE DIAGNOSIS SYSTEM FOR COOLING FANS, A FAILURE DIAGNOSIS DEVICE FOR COOLING FANS, A FAILURE DIAGNOSIS METHOD FOR COOLING FANS, A COMPUTER READABLE MEDIUM THEREFOR AND A COOLING DEVICE

This application is based upon and claims the benefit of priority from Japanese Patent Application No. 2008-241459, filed on Sep. 19, 2008, the disclosure of which is incorporated herein in its entirety by reference.

TECHNICAL FIELD

The present invention relates to a failure diagnosis technology for an electronic apparatus, in particular a failure diagnosis technology which ensures failure diagnosis of redundant cooling fans which may cause co-rotation phenomena.

BACKGROUND ART

Generally, as cooling methods for information processing systems, a cooling technology which cools electric apparatuses in an information processing system by installing a plurality of cooling fans in a redundant configuration within the information processing system is well known.

For example, Japanese Patent Application Laid-Open No. 2001-68881 discloses plural cooling fans located in an electronic apparatus. In a normal status, some of the cooling fans are set in an operating state. And in an abnormal status, additional cooling fans in the electronic apparatus are shifted into an operating state. As a result, it is possible to guarantee the normal operation of the electronic apparatus.

Further, Japanese Patent Application Laid-Open No. 2005-57119 discloses a technology in which the amount of the wind produced by plural fans is controlled according to the detection result in detecting the status of at least one fan out of the fans.

In the above-mentioned cooling fans with a redundant configuration (for example, dual-type cooling fans or push-pull-type cooling fans), the co-rotation phenomena may occur in which, in the case of a failure of a cooling fan, the cooling fan are forced to rotate improperly by the force of the wind produced by other cooling fans.

Next, description will be made in more detail about the co-rotation phenomena in dual-type cooling fans and push-pull-type cooling fans as examples.

Figure 10:
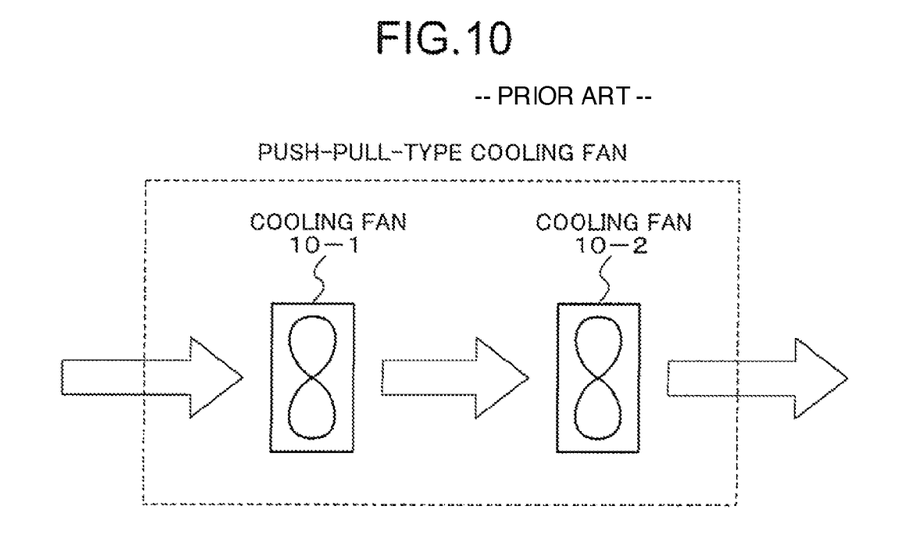
FIG. 10 is an exemplary block diagram showing a push-pull type cooling fan.

As shown in FIG. 10, in case of push-pull-type cooling fans, cooling air is inhaled into a unit by a cooling fan 10-1. It cools the inside of the unit, and then the cooling air heated as a result of such cooling is dragged toward a cooling fan 10-2, and is exhaled compulsorily to the outside of the unit.

Figure 11:
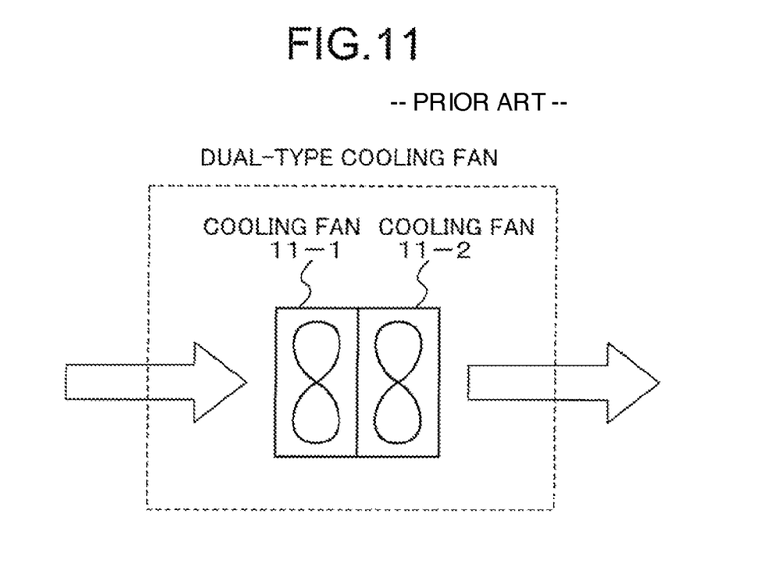
FIG. 11 is an exemplary block diagram showing a dual fan type cooling fan.

On the other hand, in case of dual-type cooling fans as shown in FIG. 11, cooling air is inhaled by a cooling fan 11-1 and internal air is pressed to the outside by a cooling fan 11-2 compulsorily.

In both of the push-pull type cooling fans and the dual-type cooling fans, the inhalation and exhalation are done in a two-stage configuration, and a fan at the former stage and a fan at the latter stage mutually influence each other.

Considering the case of the dual-type cooling fans as an example, even if a failure occurs on a cooling fan and it is no more possible to rotate by itself, the failed cooling fan may rotate due to air flow caused by the rotation of the other cooling fan (the co-rotation phenomena).

When the above-mentioned co-rotation happens, if the threshold rotation rate of cooling fans for detection of a fan failure is set to a low value and a failed cooling fan rotates faster than the threshold rotation rate because of the co-rotation phenomena, it is difficult to detect the failure of the failed fan.

As the result, a problem mentioned below is caused. That is, even though the redundant configuration no more functions adequately, the operation of the system continues and the system may stop suddenly without any caution in advance.

On the other hand, when the threshold rotation rate of cooling fans is set to a high value, the failure detection becomes too sensitive, and the variation of the rotation rates of individual cooling fans get to be unable to be ignored.

That is, even if a cooling fan is not failed but its rotation rate temporarily declines, there is a problem that the normal cooling fan is detected as a failed fan erroneously and a unnecessary log, alarm or the like is generated, requesting maintenance and causing unnecessary maintenance.

The object of the present invention is to provide a failure diagnosis system for cooling fans, a failure diagnosis device for cooling fans, a failure diagnosis method for cooling fans, a computer readable medium therefor and a cooling device, which detect a failure of cooling fans even at the time of occurrence of the co-rotation phenomena.

SUMMARY

Brief Description of the Drawings

Exemplary features and advantages of the present, invention will become apparent from the following detailed description when taken with the accompanying drawings in which.

EXEMPLARY EMBODIMENT

Next, a detailed explanation will be given of a first exemplary embodiment with reference to the drawings.

Figure 1:
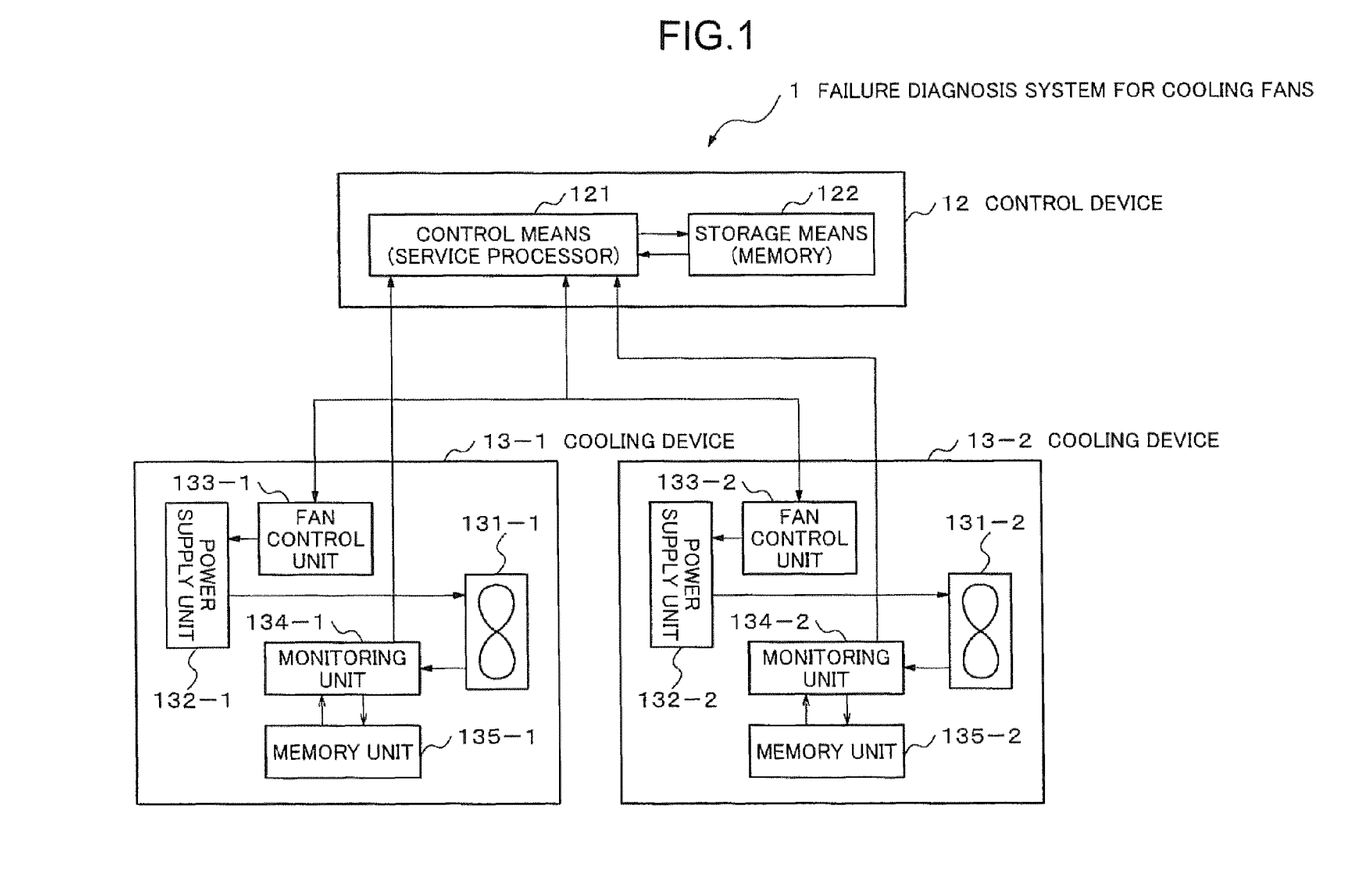
FIG. 1 is an exemplary block diagram showing a failure diagnosis system of cooling fans of the first and second embodiment of the present invention.

FIG. 1 is a block diagram showing a failure diagnosis system 1 for cooling fans in the first exemplary embodiments of the present invention.

In FIG. 1, the failure diagnosis system 1 includes a control device 12, and cooling devices 13-1 and 13-2.

The cooling devices 13-1 and 13-2 are configured in a redundant structure.

Figure 2:
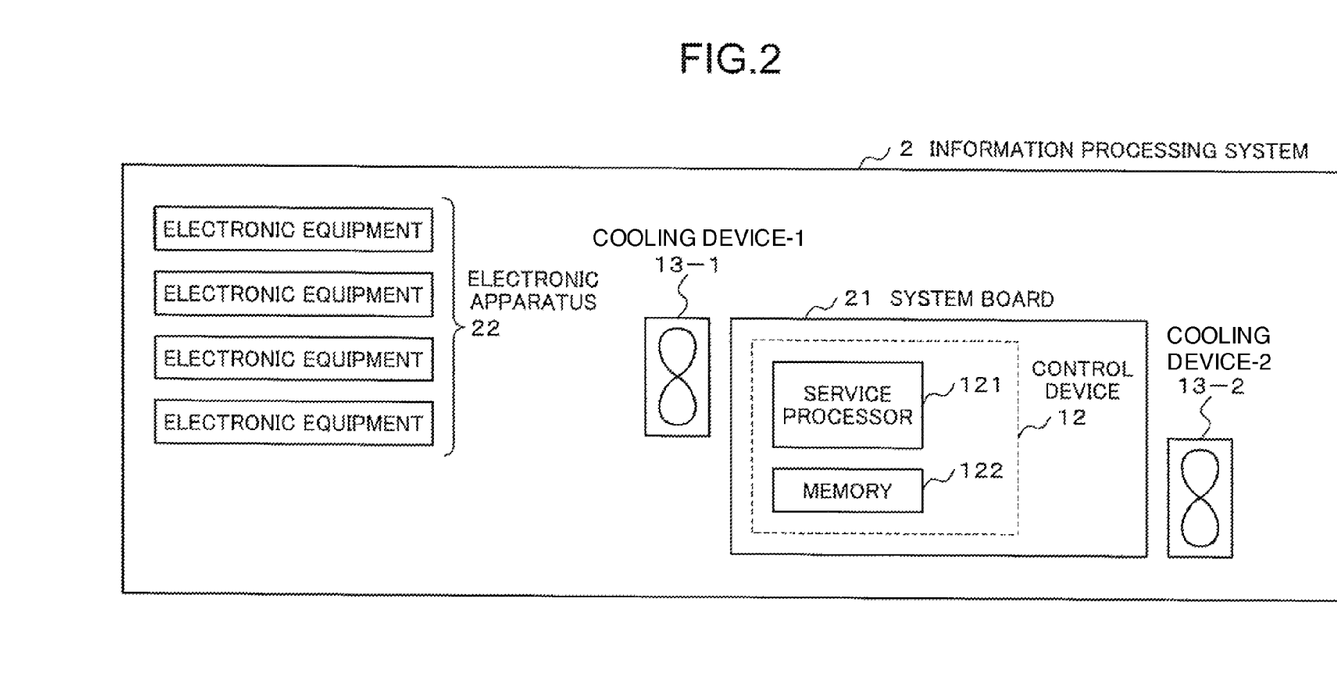
FIG. 2 is an exemplary block diagram showing the failure diagnosis system 1 of the cooling fan when it is installed in an information processing system 2.

The failure diagnosis system 1 in FIG. 1 can be installed in an information processing system. FIG. 2 is a block diagram showing an information processing system 2 in which the failure diagnosis system 1 is installed. The information processing system 2 includes the cooling devices 13-1 and 13-2, a system board 21, and various electronic apparatuses 22 such as input equipments and auxiliary storage equipments. The control device 12 is installed and arranged in the system board 21.

Further, the failure diagnosis system 1 does not necessarily have to be included in the information processing system 2, and the place in which the failure diagnosis system 1 is installed is not limited to this example.

In FIG. 1, the control device 12 includes a control means 121 and a storage means 122.

The control means 121 executes a failure diagnosis and a periodic diagnosis of the cooling devices 13-1 and 13-2. The detailed description of the failure diagnosis and the periodic diagnosis will be made later.

Failure diagnosis information and periodic diagnosis information are stored in the storage means 122. The failure diagnosis information includes timing information on the timing of the failure diagnosis and history information on the history of the failure diagnosis. For example, when the timing information indicates that the timing of the failure diagnosis is ten minutes, the control device 12 executes the failure diagnosis of the cooling devices at every ten minutes. History information on the history of the periodic diagnosis is included in the periodic diagnosis information.

Further, as mentioned below, in this embodiment, the control means 121 is a service processor and the storage means 122 is a memory, but these are not limited to those.

The cooling device 13-1 includes a-cooling fan 131-1, a power supply unit 132-1, a fan control unit 133-1, a monitoring unit 134-1, and a memory unit 135-1.

The cooling device 13-2 includes a cooling fan 131-2, a power supply unit 132-2, a fan control unit 133-2, a monitoring unit 134-2, and a memory unit 135-2.

The power supply units 132-1 and 132-2 supply electric power to the cooling devices 13-1 and 13-2 respectively.

The fan control units 133-1 and 133-2 control the power supply units 132-1 and 132-2 respectively based on a control signal from the service processor 121.

The monitoring units 134-1 and 134-2 check the normality of the cooling fans 131-1 and 131-2, and report the results to the service processor 121.

The memory unit 135-1 stores a failure diagnosis table 3 (see FIG. 3) for a trouble diagnosis, and the memory unit 135-2 stores a periodic diagnosis table 4 (see FIG. 4) for a periodic diagnosis.

Figure 3:
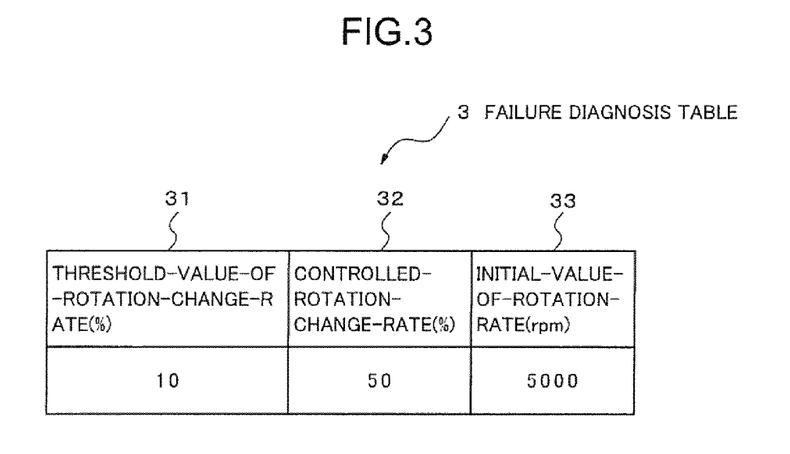
FIG. 3 is an exemplary drawing showing a failure diagnosis table 3.

As shown in FIG. 3, the failure diagnosis table 3 includes a threshold-value-of-rotation-change-rate field 31, a controlled-rotation-change-rate field 32, and an initial-value-of-rotation-rate field 33.

In the table 3 in FIG. 3, the field 31 shows 10%, and this means that when the rotation change rate to the initial value of the rotation rate set for the target cooling fan is not less than 10%, the fan is failed. In the table, the value shown by the field 32 is 50%, and this means that the rotation rate of a target cooling fan is reduced to 5096 of the initial rotation rate at the time of the diagnosis.

Further, if the value shown by the field 32 is 80%, this means that the rotation rate of the target cooling fan is reduced to 20% (i.e. 100%−80%=20%) of the initial rotation rate.

Further, if the value shown by the field 32 is 100%, this means that the rotation rate of the target cooling fan is set to 0 rpm (revolution per minute) (i.e. the rotation of the target cooling fan is stopped).

In the table 3, the field 33 shows 5,000 rpm. This means that the cooling fans rotate at 5,000 rpm in the normal status.

Next, description will be made on the outline of a failure diagnosis method using the failure diagnosis table 3. In the description below, by controlling the rotation rate of the cooling fan 131-1, a failure diagnosis is executed for the other cooling fan 131-2 using the failure diagnosis table 3.

First, because the value shown by the field 33 is 50%, the rotation rate of the cooling fan 131-1, which is the controlled object, is dropped to 2,500 rpm.

At that time, the cooling fan 131-2 is supposed to be normal if the rotation rate of the cooling tan 131-2 is within the range from 4500 (5,000−500) rpm to 5500 (5000+500) rpm. On the other hand, if the rate is less than 4,500 rpm or more than 5,500 rpm, the cooling fan 131-2 is supposed to be broken.

Here, it goes without saying that the values of each field in the failure diagnosis table 3 shown in FIG. 3 are given as examples and are not limited to these. That is, these values and the numerical relationship of the values are selected at least so that a failed cooling fan which is rotating under the co-rotation phenomena can be detected.

For example, it is also possible to correlate the threshold value of the rotation rate of controlled cooling fans with the threshold value of the rotation rate of a cooling fan which is under the diagnosis.

Figure 4:
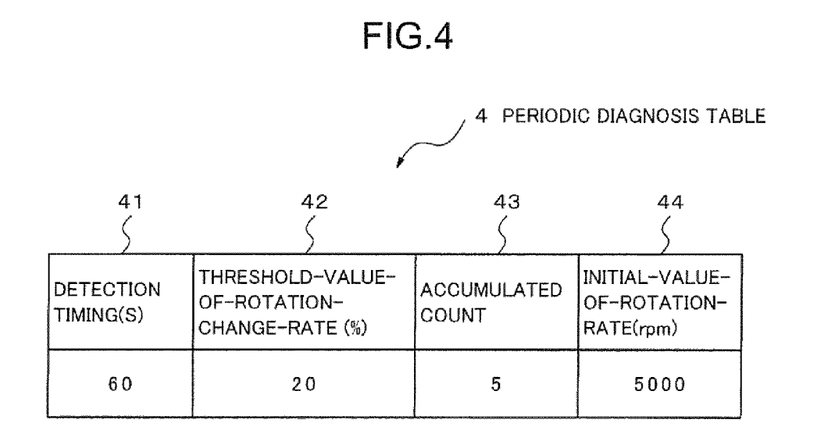
FIG. 4 is an exemplary drawing showing a periodic diagnosis table 4.

FIG. 4 is a diagram showing an example of the periodic diagnosis table 4.

The periodic diagnosis table 4 includes a detection timing field 41, a threshold-value-of-rotation-change-rate field 42, an accumulated count field 43, and an initial-value-of-rotation-rate field 44.

In the example, the detection timing field 41 shows 60 seconds, and this means that the monitoring units 134-1 and 134-2 execute an error detection of the cooling fans 131-1 and 131-2 every 60 seconds.

The field 42 shows 20%, and this means that it is requested to execute the error detection of the cooling fans 131-1 and 131-2 when the difference between the rotation rate of at least one of the fans and the initial value (i.e. 5,000 rpm) set for the fans is not less than 20% of the initial value.

The accumulated count field 43 shows five, and this means that, when the accumulated count of the error detection exceeds five, the monitoring units 134-1 and 134-2 send error signals to the service processor 121 and the service processor generates an alarm.

The field 44 shows 5,000 rpm, and this means that the cooling fans are made to rotate at 5,000 rpm while no failure diagnosis is executed.

In the embodiment, to execute the error detection of the other cooling fans while reducing the rotation rate of a cooling fan is called "failure diagnosis", and to execute the error detection periodically based on the periodic diagnosis table 4 is referred to as "periodic diagnosis".

In the above-mentioned example, although the cooling devices 13-1 and 13-2 each have the failure diagnosis table 3 of the identical contents to each other and the periodic diagnosis table 4 of the identical contents to each other, it is not limited to this example.

Next, description will be given about an general flow of the failure diagnosis in the embodiment using the flowchart in FIG. 5.

First, a first failure diagnosis is executed. That is, the service processor 121 accesses the memory 122 and gets history information of failure diagnosis, and selects, as an object of control, one fan among the cooling fans in the devices (S501 in FIG. 5). In this case, first, it is supposed that the cooling fan 131-1 was selected as the object of control.

Then, the service processor 121 sends a control signal for masking error signals in the periodic diagnosis of the cooling fan 131-1 to the monitoring unit 134-1 of the cooling device 13-1 (S502).

In response to the control signal, the monitoring unit 134-1 stops the monitoring of error signals in the periodic diagnosis of the cooling fan 131-1 (S503).

Further, the service processor 121 sends a control signal which instruct the reduction of the rotation rate of the cooling fan 131-1 to the fan control unit 133-1 (S504).

Then, the fan control unit 133-1 decreases the output current of the power supply unit 132-1 to reduce the rotation rate of the cooling fan 131-1 which is the object of control (S505).

In this case, because the rotation rate of the cooling fan 131-1 reduces beyond the threshold value shown by the field 42 in the periodic diagnosis table 4, an error would be detected in the periodic diagnosis usually.

However, at present, as mentioned above, because the masking of error signals in the periodic diagnosis of the cooling fan 131-1 has been executed in advance, the error signals are not detected.

In addition, the service processor 121 instructs the monitoring unit 134-2 of the other cooling device (i.e. the cooling device 13-2) to monitor the rotation rate of the fan 131-2 (S506).

Then, the monitoring unit 134-2 accesses the memory unit 135-2, reads the failure diagnosis table 3, and monitors the rotation rate of the cooling fan 131-2 based on the failure diagnosis table 3 (S507).

The rotation rate of the cooling fans is detected by a sensor or other means installed in both the cooling devices 13-1 and 13-2, but not illustrated in the drawings.

Next, the monitoring unit 134-2 of the cooling device 13-2 checks whether the rotation rate of the cooling fan 131-2 exceeds the threshold value shown by the field 31 in the failure diagnosis table 3 (S508).

If the rotation rate of the cooling fan 131-2 exceeds the threshold value (i.e. the rotation rate is less than 4,500 rpm or more than 5,500 rpm), then the monitoring unit 134-2 sends an error signal to the service processor 121, meaning that a failure is detected (S509).

The service processor 121 updates the history information of failure diagnosis and notifies an alarm to the user and others (S510).

On the other hand, if it does not exceed the threshold value in Step S508 (i.e. the rotation rate is within the range from 4,500 to 5,500 rpm), the monitoring unit 134-2 recognizes that the fan is normal and reports to the service processor 121 to that effect (S511).

Then, the service processor 121 updates the history information of failure diagnosis and instructs the restoration of the rotation rate of the cooling fan 131-1 in the cooling device 13-1 (S512).

In response to this instruction, the fan control unit 133-1 of the cooling device 13-1 controls the power supply unit 132-1 and restore the rotation rate of the cooling fan 131-1 to the initial value (i.e. 5,000 rpm) (S513).

Then, the service processor 121 issues a release order to the monitoring unit 134-1 so as to stop the masking of error signals in the periodic diagnosis of the cooling fan 131-1 (S514).

The monitoring unit 134-1 stops the mask processing (3515).

In this manner, the first failure diagnosis is completed.

Then, the service processor 121 checks whether the cooling devices that were not selected as the object of control by the previous failure diagnoses (i.e. in this embodiment, the first failure diagnosis) exist or not (S516).

If a cooling device which was not selected as the object of control exists, the processing is repeated from Step S501.

On the other hand, if a cooling device which was not selected as the object of control does not exist, the failure diagnosis is completed.

At present, because the failure diagnosis for the cooling device 13-2 has not yet been executed, the cooling device 13-2 is selected in Step S516.

After that, the second failure diagnosis, which selects the cooling device 13-2 as the object of control, is executed.

Although the object of control and the object of diagnosis change places with each other in the first failure diagnosis and the second failure diagnosis, the operation process in the second failure diagnosis is almost the same as that in the first failure diagnosis.

Therefore, the description of the second failure diagnosis is omitted.

In this embodiment, when the second failure diagnosis has been completed, because the cooling device which was not selected as the object of control in any previous failure diagnoses (i.e. the first and second failure diagnoses) no more exists, the entire failure diagnosis has been completed.

Further, the order of Steps S512 to S515 is an example, and is not limited to that order, but the order may be the following order of steps: S514-S515-S512-S513.

In addition, Step S512 and Step 3514 can be executed simultaneously and also Step S513 and Step S515 can be executed simultaneously.

Next, description will be made of a general flow of the periodic diagnosis, referring to the flowchart in FIG. 6.

The periodic diagnosis is executed by the cooling devices 13-1 and 13-2 respectively.

Hereinafter, although description will be given of the cooling device 13-1 as an example, the operation of the cooling device 13-2 is similar to that of the cooling device 13-1.

The monitoring unit 134-1 accesses the memory unit 135-1, and reads the periodic diagnosis table 4 each time an error detection should be performed (i.e. in the embodiment, every 60 seconds) (S601 and S602).

Then, the monitoring unit 134-1 checks whether the difference between the initial value (the 5,000 rpm) and the current rotation rate of the cooling fan 131-1 is within the range of the threshold value.

That is, it is checked if the rotation rate of the cooling fan 131-1 is within the range from 4,000 (5,000−1,000) to 6,000 (5,000+1,000) rpm.

As the result, if it is detected that the rotation rate is within the range indicated by the threshold value (S603), it is recognized that the fan is normal, and the processing returns to the process of Step S601 (S604).

On the other hand, if it is detected that the rotation rate is out of the rang indicated by the threshold value (S603), the monitoring unit 134-1 checks if it has been instructed to mask error signals by the service processor 121 (S605).

If the monitoring unit has been instructed to do so, it checks that the rotation rate of the cooling fan 131-1 is intentionally reduced, and the processing returns to S601.

On the other hand, if the monitoring unit has not instructed to do so, the monitoring unit checks if the accumulated count of errors exceeds five (i.e. the value shown by the field 43 in the periodic diagnosis table 4) (S606).

If the count exceeds five, the monitoring unit 134-1 sends an error signals to the service processor 121 (S607).

On the other hand, if the count does not exceed five, the process returns to Step S601.

Figure 6:
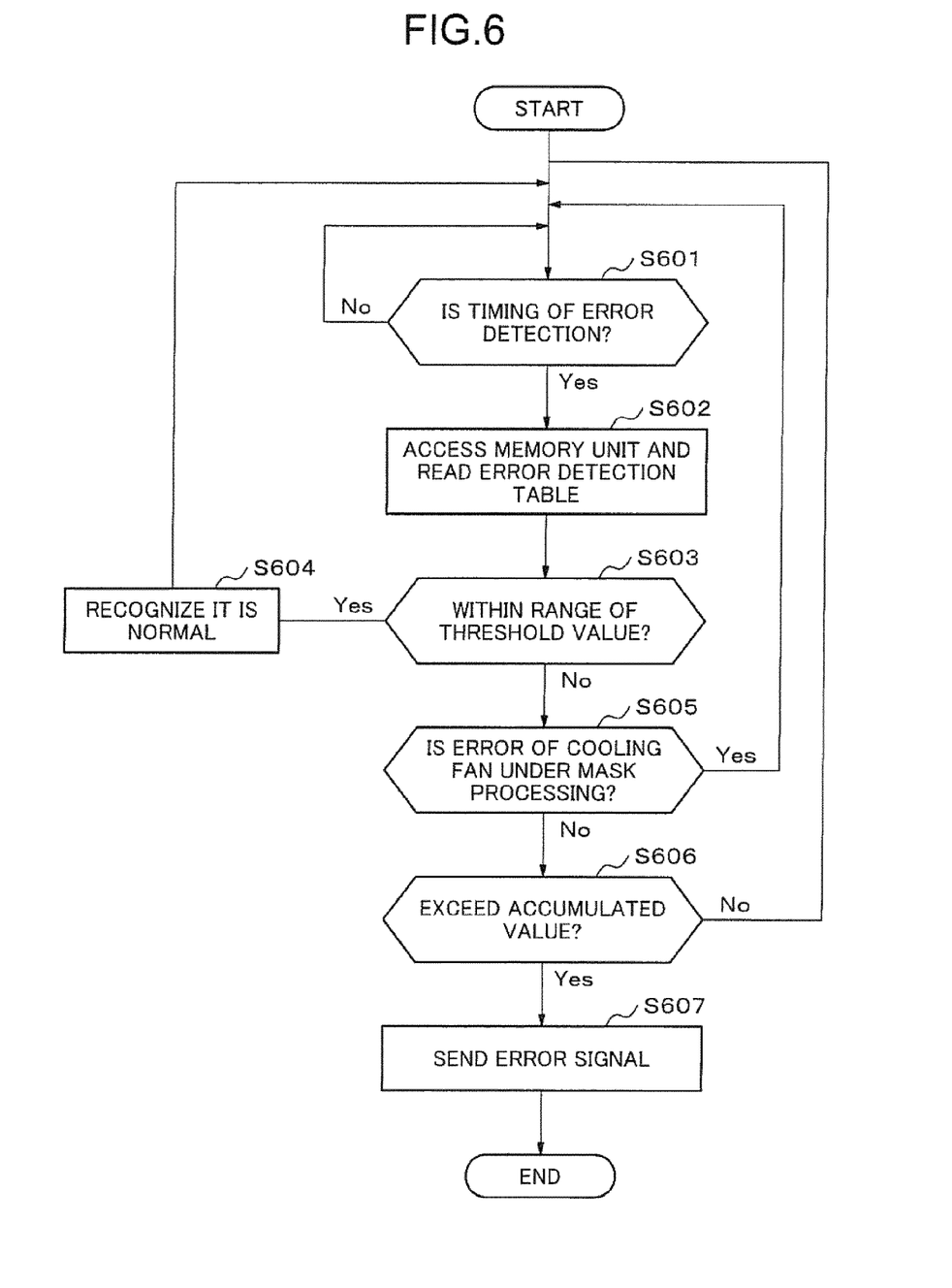
FIG. 6 is a general flow of a periodic diagnosis in the first and the second embodiments of the present invention.

Further, although it is not shown in the flowchart in FIG. 6, when the service processor 121 receives the error signals from the monitoring unit 134-1, the processor notifies an error to the user or others.

According to the embodiment, although the information on the timing of the periodic diagnosis is included in the periodic diagnosis table 4, the information may be included in the periodic diagnosis information in the memory 122.

In this case, the control device 12, at the timing of the periodic diagnosis, orders the execution of the periodic diagnosis to the cooling devices 13-1 and 13-2.

According to this embodiment, although the failure diagnosis system 1 manages the two cooling devices, the number of cooling devices is not limited to two.

Figure 7:
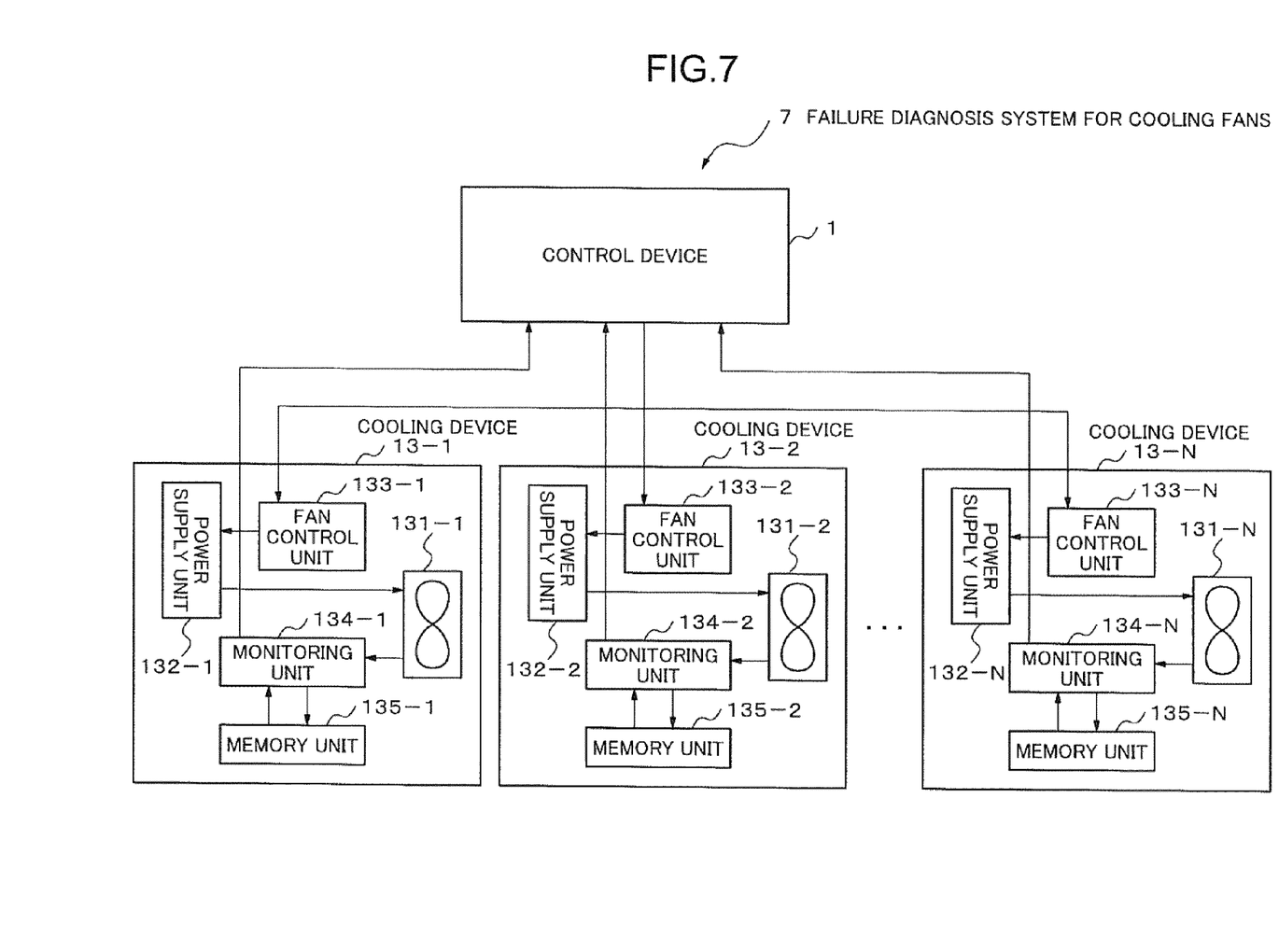
FIG. 7 is a failure diagnosis system of cooling fans having N cooling equipments, where N is not less than 3.

For example, as shown in FIG. 7, a failure diagnosis system 7 may manage cooling devices 13-1 to 13-N, where N is an integer which is not less than three.

Further, when the failure diagnosis system has N (where N is an integer which is not less than 3) cooling devices 13-1 to 13-N, it may execute the failure diagnosis, the plurality of cooling devices being given as objects of control.

In this manner, in the embodiment, in addition to the execution of the periodic diagnosis as shown in FIG. 6, a failure diagnosis is executed based on the rotation rate of the cooling fan 131-2 in the state in which the rotation rate of the cooling fan 131-1 is intentionally reduced (or stopped).

In the embodiment, the failure diagnosis is executed in the state in which the air flow (i.e. the wind force) of the cooling fan 131-1 that is supposed to cause the co-rotation phenomena is decreased. As a result, the failure detection of the cooling fans can precisely be executed even at the time of occurrence of the co-rotation phenomena.

Next, as a modification of the first embodiment, a second exemplary embodiment is described.

Figure 5:
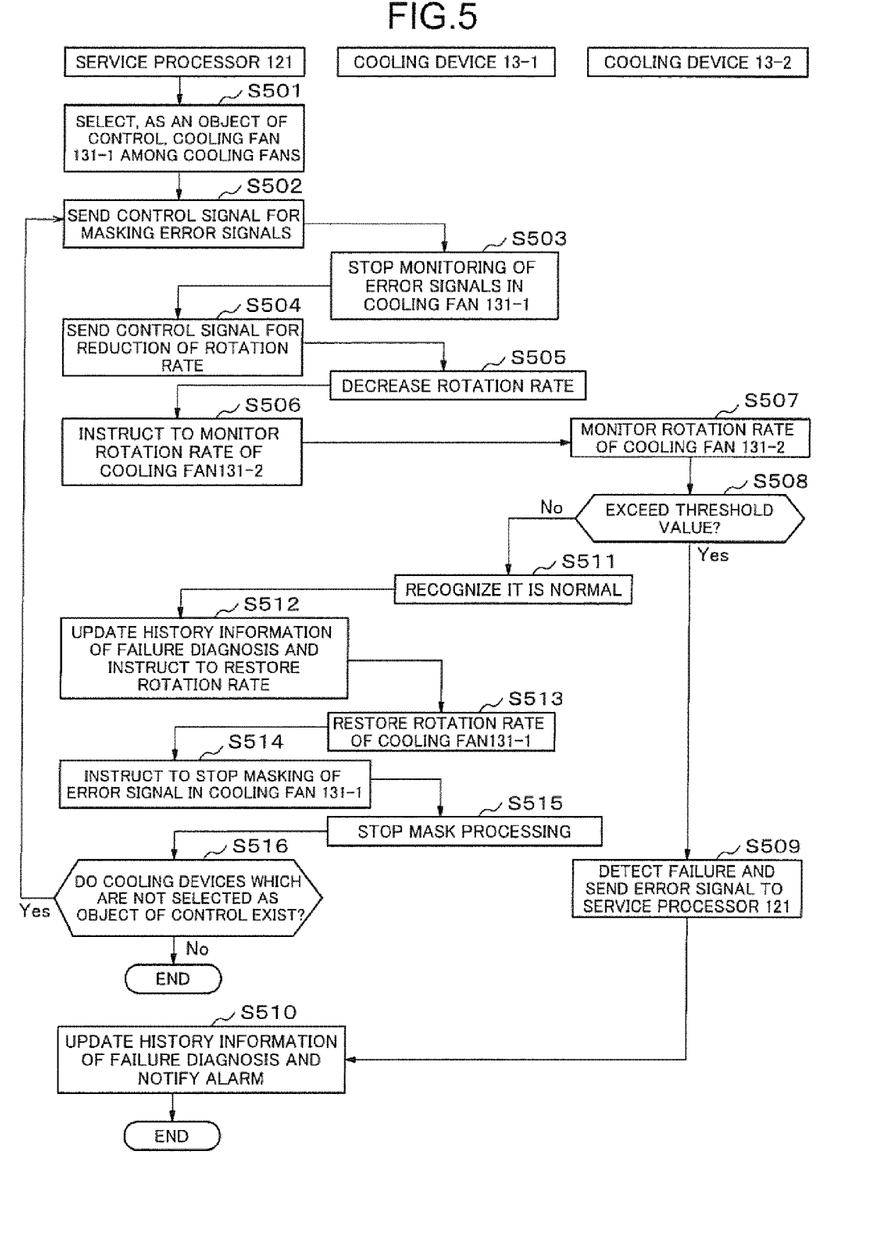
FIG. 5 is a general flow of a failure diagnosis in the first embodiment of the present invention.

In the first embodiment, in Steps S508 to S509 in FIG. 5, a failure was diagnosed once the rotation rate exceeded the threshold value. On the other hand, in the second embodiment, a failure is diagnosed only when the rotation rate exceeds the threshold value several times. This is a different point between the first embodiment and the second embodiment.

Figure 8:
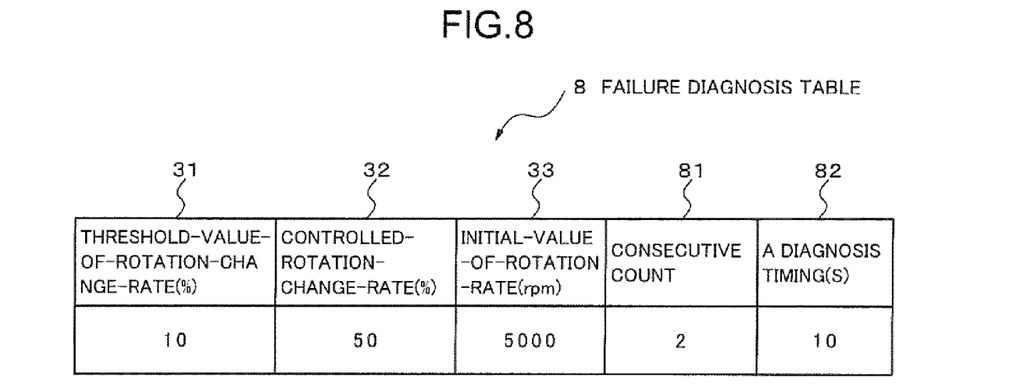
FIG. 8 is an exemplary drawing showing a failure diagnosis table 8.

FIG. 8 shows an example of a failure diagnosis table 8 in the embodiment.

The failure diagnosis table 8 includes the threshold-value-of-rotation-change-rate field 31, the controlled-rotation-change-rate field 32, the initial-value-of-rotation-rate field 33, a consecutive count field 81, and a diagnosis timing field 82.

The consecutive count field 81 and the diagnosis timing field 82 are added in comparison with the first embodiment.

In the embodiment, the value shown by the consecutive count field 81 is "2" meaning "twice", and this means that a fan is judged a failure only when the rotation rate of the fan exceeds the threshold value two consecutive times in Step S508 in FIG. 5.

In addition, the value shown by the field 82 is "ten seconds", and this means that, in Step S508 in FIG. 5, once it is judged that the rotation rate exceeds the threshold value, a check is made ten seconds later again on whether it exceeds the threshold value or not.

Figure 9:
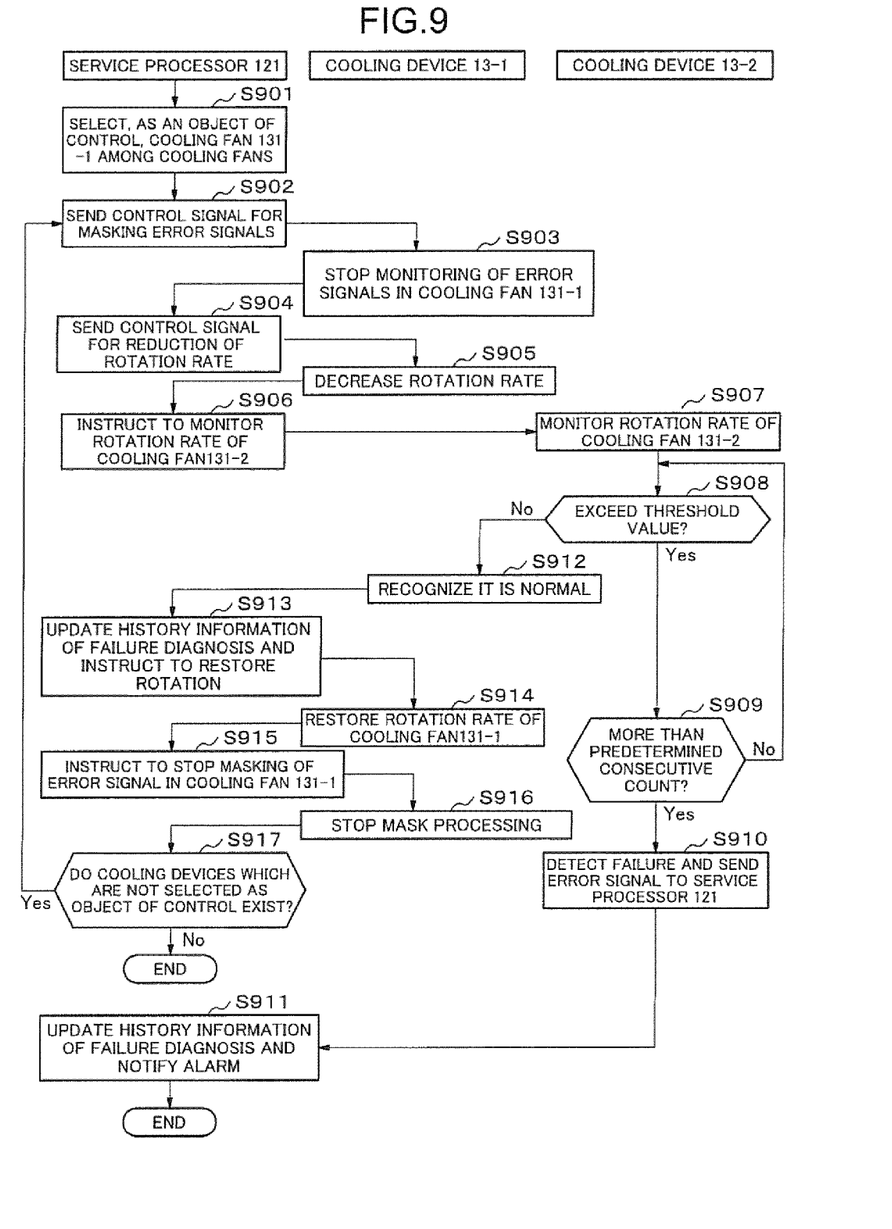
FIG. 9 is a general flow of the failure diagnosis in the second embodiment of the present invention.

Next, description will be made of a general flow of the failure diagnosis in the embodiment, referring to the flowchart in FIG. 9.

Because Steps S901 to S908 are similar to Steps S501 to S508 in FIG. 5, a detailed description about them will be omitted.

Because Steps S912 to S917 are also similar to Steps S511 to S516 in FIG. 5, a detailed description about them will be omitted.

In the embodiment, when the threshold value is exceeded in Step S908 (i.e. the rotation rate of the cooling fan 131-2 is less than 4,500 rpm or more than 5,500 rpm), a check is made about whether the number of times by which the rotation rate of the fan 131-2 exceeded the threshold value exceeds the value shown by the consecutive count field 81 (Step S909).

If the number of consecutive times by which the rotation rate of the fan 131-2 exceeded the threshold value exceeds the value shown by the consecutive count field 81, the monitoring unit 134-2 sends an error signal to the service processor 121, meaning that a failure has been detected (Step S910).

Further, the service processor 121 updates the history information of failure diagnosis and notifies an alarm to the user or others (Step S911).

On the other hand, if the number of consecutive times by which the rotation rate of the fan 131-2 exceeded the threshold value is less than the value shown by the consecutive count field 81, the same diagnosis is executed again after the time indicated by the diagnosis timing field 82 has passed (Step S908 and 909).

Further, in the failure diagnosis, the error detection may be executed only when the accumulated count of error detection exceeds a predetermined value which is set in advance, similar to the case of the periodic diagnosis.

Also, in the periodic diagnosis, the error detection may be executed only when the number of consecutive times of error detection exceeds a predetermined value which is set in advance, as the case of the failure diagnosis of this embodiment.

Therefore, in the second embodiment, even at the time of occurrence of the co-rotation phenomena, it can ensure to execute the detection of failure of a cooling fan can surely be performed, similar to in the first embodiment.

The previous description of embodiments is provided to enable a person skilled in the art to make and use the present invention.

Moreover, various modifications to these exemplary embodiments will be readily apparent to those skilled in the art, and the generic principles and specific examples defined herein may be applied to other embodiments without the use of inventive faculty.

Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A failure diagnosis system for cooling fans, comprising:
a first cooling device having a first cooling fan;
a second cooling device having a second cooling fan; and a control device executing a first failure diagnosis which checks the failure of said second cooling fan based on the rotation rate of said second cooling fan at a first time at which the rotation rate of said first cooling fan is reduced or stopped, wherein after said first failure diagnosis, said control device executes a second failure diagnosis which checks the failure of said first cooling fan based on the rotation rate of said first cooling fan at a second time at which the rotation rate of said second cooling fan is reduced, said control device issues a monitoring instruction for said first failure diagnosis and said second failure diagnosis to said first and second cooling devices to monitor at a predetermined timing, said first cooling device further comprises:
 a first monitoring unit monitoring the rotation rate of said first cooling fan, and
 a first memory unit in which a first threshold value information of the rotation rate is stored, said second cooling device further comprises:
 a second monitoring unit monitoring the rotation rate of said second cooling fan, and
 a second memory unit in which a second threshold value information of the rotation rate is stored, in response to said monitoring instruction said first and second monitoring units check the normality of the rotation rate of said first cooling fan and said second cooling fan, respectively, based on said first and second threshold value information, and each send an error signal to said control device when the rotation rate is not normal, said first memory unit has a third threshold value information of the rotation rate, said second memory unit has a fourth threshold value information of the rotation rate, said first and second monitoring units check the normality of the rotation rate of said first and second cooling fan, respectively, based on said third and fourth threshold value information at a predetermined timing, and each execute a periodic diagnosis in which said error signal is sent to said control device when the rotation rate is not normal, a first monitoring unit starts to execute, before said first failure diagnosis, a first mask processing which masks said error signal which is to be detected in said periodic diagnosis and stops said first mask processing after said first failure diagnosis, and a second monitoring unit starts to execute, before said second failure diagnosis, a second mask processing which masks said error signal which is to be detected in said periodic diagnosis and stops said second mask processing after said second failure diagnosis.

2. The failure diagnosis system for cooling fans according to claim 1, wherein said control device executes said second failure diagnosis based on the rotation rate of said first cooling fan at the second time at which the rotation of said second cooling fan is stopped.

3. The failure diagnosis system for cooling fans according to claim 1, wherein said first and second monitoring units each send said error signal to said control device, when the total of the number of times by which it is judged that the rotation rate is not normal exceeds a predetermined value or when the number of consecutive times by which it is judged that the rotation rate is not normal exceeds a predetermined value.

4. The failure diagnosis system for cooling fans according to claim 1, wherein said control device generates an alarm when receiving said error signal.

5. A failure diagnosis method for a system including a first cooling fan and a second cooling fan, comprising:
 reducing the rotation rate of said first cooling fan;
 executing as a first failure diagnosis the failure diagnosis of said second cooling fan based on the rotation rate of said second cooling fan at a first time at which the rotation rate of said first cooling fan is reduced or stopped;
 reducing the rotation rate of said second cooling fan after said first failure diagnosis is executed; and
 executing as a second failure diagnosis the failure diagnosis of said first cooling fan based on the rotation rate of said first cooling fan, wherein
 a decision is made on whether the rotation rate of said first cooling fan and said second cooling fan are normal or not based on first threshold value information of the rotation rate of the first cooling fan and the second threshold value information of the rotation rate of the second cooling fan in said first and second failure diagnoses,
 an error is detected when the rotation rate of said first or second cooling fan is not normal in said first or second failure diagnosis, and
 the failure diagnosis method further comprises:
  checking as a periodic diagnosis the normality of said first cooling fan and said second cooling fan based on third threshold value information of the rotation rate of said first cooling fan and fourth threshold value information of the rotation rate of said second cooling fan;
  detecting an error when said first cooling fan or said second cooling fan is not normal;
  executing as a first masking, before said first failure diagnosis is executed, a mask processing of said error signal which is to be detected in said periodic diagnosis;
 stopping said first masking after said first failure diagnosis is executed;
 executing as a second masking, before said second failure diagnosis is executed, a mask processing of said error signal which is to be detected in said periodic diagnosis; and
 stopping said second masking after said second failure diagnosis.

6. The failure diagnosis method according to claim 5, wherein the second failure diagnosis is executed based on the rotation rate of said first cooling fan at a second time at which the rotation of said second cooling fan is stopped.

7. The failure diagnosis method according to claim 5, wherein an error is detected when the total of the number of times by which it is judged that the rotation rate is not normal exceeds a predetermined value or when the number of consecutive times by which it is judged that the rotation rate is not normal exceeds a predetermined value, in said first and second failure diagnosis and said periodic diagnosis.

8. The failure diagnosis method according to claim 5, wherein an alarm is initiated when detecting errors in said first and second failure diagnosis and said periodic diagnosis.

9. A non-transitory computer readable medium having recorded thereon a program executable by a computer to perform a failure diagnosis method of a system including a first cooling fan and a second cooling fan, the method comprising:
 reducing the rotation rate of said first cooling fan;
 executing as a first failure diagnosis the failure diagnosis of said second cooling fan based on the rotation rate of said second cooling fan at a first time at which the rotation rate of said first cooling fan is reduced or stopped;

reducing the rotation rate of said second cooling fan after said first failure diagnosis is executed; and executing as a second failure diagnosis the failure diagnosis of said first cooling fan based on the rotation rate of said first cooling fan, wherein a decision is made on whether the rotation rate of said first cooling fan and said second cooling fan are normal or not based on first threshold value information of the rotation rate of the first cooling fan and the second threshold value information of the rotation rate of the second cooling fan in said first and second failure diagnoses, an error is detected when the rotation rate of said first or second cooling fan is not normal in said first or second failure diagnosis, and the failure diagnosis method further comprises:
- checking as a periodic diagnosis the normality of said first cooling fan and said second cooling fan based on third threshold value information of the rotation rate of said first cooling fan and fourth threshold value information of the rotation rate of said second cooling fan;
- detecting an error when said first cooling fan or said second cooling fan is not normal;
- executing as a first masking, before said first failure diagnosis is executed, a mask processing of said error signal which is to be detected in said periodic diagnosis;
- stopping said first masking after said first failure diagnosis is executed;
- executing as a second masking, before said second failure diagnosis is executed, a mask processing of said error signal which is to be detected in said periodic diagnosis; and
- stopping said second masking after said second failure diagnosis.

10. The non-transitory computer readable medium according to claim 9, wherein said second failure diagnosis is executed based on the rotation rate of said first cooling fan at a second time at which the rotation of said second cooling fan is stopped.

11. The non-transitory computer readable medium according to claim 9, wherein an error is detected when the total of the number of times by which it is judged that the rotation rate is not normal exceeds a predetermined value or when the number of consecutive times by which it is judged that the rotation rate is not normal exceeds a predetermined value, in said first and second failure diagnosis and said periodic diagnosis.

12. The non-transitory computer readable medium according to claim 9, wherein an alarm is initiated when error is detected in said first and second failure diagnosis.

* * * * *